Nov. 27, 1945.    D. V. SARBACH    2,389,641

METHOD OF ADHERING RUBBERY MATERIAL TO SMOOTH SURFACES

Filed Feb. 6, 1941

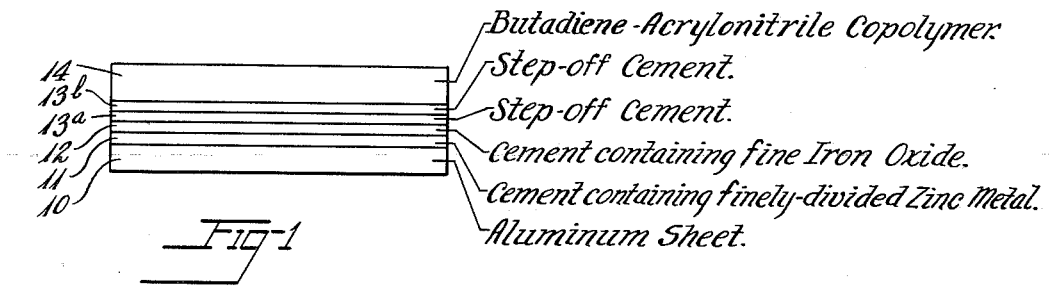

Fig-1

- Butadiene-Acrylonitrile Copolymer.
- Step-off Cement.
- Step-off Cement.
- Cement containing fine Iron Oxide.
- Cement containing finely-divided Zinc Metal.
- Aluminum Sheet.

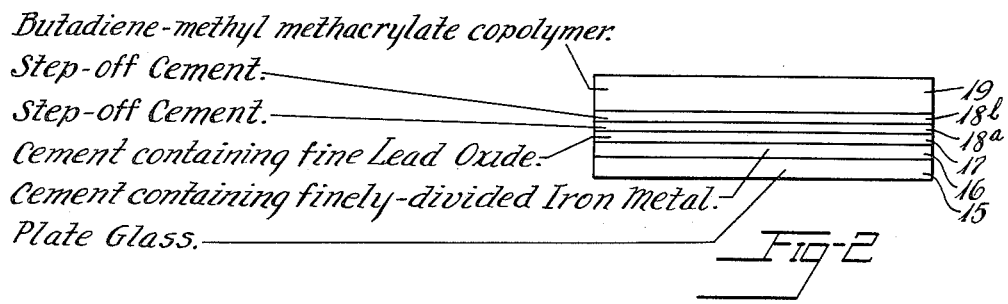

Fig-2

- Butadiene-methyl methacrylate copolymer.
- Step-off Cement.
- Step-off Cement.
- Cement containing fine Lead Oxide.
- Cement containing finely-divided Iron Metal.
- Plate Glass.

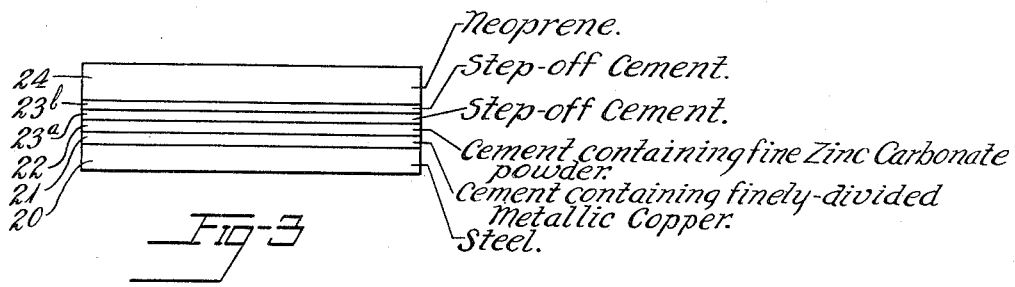

Fig-3

- Neoprene.
- Step-off Cement.
- Step-off Cement.
- Cement containing fine Zinc Carbonate powder.
- Cement containing finely-divided Metallic Copper.
- Steel.

Inventor
Donald V. Sarbach
By Hope L. Woodruff
Atty.

Patented Nov. 27, 1945

2,389,641

UNITED STATES PATENT OFFICE 2,389,641

METHOD OF ADHERING RUBBERY MATERIAL TO SMOOTH SURFACES

Donald V. Sarbach, Cuyahoga Falls, Ohio, assignor to The B. F. Goodrich Company, New York, N. Y., a corporation of New York Application February 6, 1941, Serial No. 377,686

9 Claims. (Cl. 154—2)

This invention relates to a method of adhering rubbery materials, and particularly the synthetic elastics, to smooth surfaces of such base members as metal, glass, enamel, wood, and similar materials of construction.

With the increasing importance of rubbery materials and particularly the many butadiene polymers and copolymers, in industrial applications there are many problems necessary to be solved before the full value of the rubbery materials can be realized. Among these problems and one that has never been satisfactorily solved up to now, is the very important one of adhering these rubbery materials to other materials and particularly to materials having smooth surfaces.

I have discovered a method of bonding rubbery materials, and particularly synthetic elastics such as the butadiene copolymers, neoprene, and the like, to the surfaces of a wide variety of base members, and particularly to those of metal, polished metal, glass, enamel, wood, and the like to which adhesion has always been extremely difficult to obtain. The composite structure made according to the method of this invention provides the rubbery material bonded to the surface with a bond that is very strong, tear resistant, and long lasting. By the method of this invention I secure the adhesion through the use of finely-powdered metal in a primer coating interposed between the surface of the base member and the rubbery material and applied next to the surface of the base member. As better results are obtained it is preferred that an additional primer coat be applied over the first coat and that it contain the same vehicle as is in the first coat with a finely-divided hard material dispersed throughout the second coat. This hard material may be any water-insoluble material that may be produced in a finely-divided state, preferably with particles between 0.1 and 15 microns in diameter.

In practicing typical embodiments of the invention, I first clean the surface of the base member by any of the usual methods, dependent, of course, upon the type of base member used, then apply a primer coat containing a substantial amount of a finely-divided metal. This is allowed to dry and then, preferably, another primer coat containing a finely-divided hard material such as a metallic oxide is applied to this first coat and allowed to dry. After this one or more "step-off" cements preferably are applied in successive layers until the final slab of rubbery material is pressed into place. These "step-off" cements are used so as to uniformly progress from the material of the primer coat to the rubbery material to secure adequate adhesion between each layer. The "step-off" cements are usually mixtures comprising the primer coat vehicle and and the rubbery material, that is to be adhered and are used between the primer coat and the rubbery material in order to secure adequate adhesion. The number and kind of "step-off" coatings depend entirely upon the vehicle in the primer coat and the rubbery material. Most of the "step-off" cements are vulcanizable and are vulcanized during the operation of making the composite structure. By the proper choice of compounding ingredients in the "step-off" cements any rate of vulcanization may be obtained but for convenience of application it is usually recommended that the cements be vulcanizable by standing at ordinary room temperature or, as it is commonly known, by air curing.

The primer coatings of this invention that are applied next to the surface of the base member to which the rubbery material is adhered may have as vehicles any of a wide variety of binders for the finely-divided metal and hard material. Binders such as chlorinated rubber, thermoprene, and similar rubber isomers, rubber hydrochloride, polyvinyl chloride, cellulose ester, and the like, may be used, preferably in a cement form. One or more "step-off" cements are used in order to progress from the primer coats to the rubbery material that it is intended to adhere. If the assembly is air-curing, the rubbery material is merely pressed into close contact with the various coatings and allowed to stand. If heat is required to vulcanize the assembly, the usual way is to place the assembly in a vulcanization press and vulcanize.

The first primer coat that is applied should contain a finely-divided metal or mixture of metals with particles preferably spherical in shape and from 0.5 to 45 microns in diameter, with an average diameter of from 2 to 10 microns. The second primer coat should contain a finely-divided hard material such as a metal, metal oxide, metal carbonate, metal hydroxide, metal sulfate, ground glass, slaked lime, water-insoluble barium salts, or similar materials that can be produced in the form of fine, hard particles that retain their individual size and shape under the forces of compounding and service. The hard material in the second primer coat should differ either in composition or in particle size from the metal in the first primer coat but it is not necessary, however, that the particles be of any particular shape. For best adhesion it is recommended that the second primer coat contain particles of a metallic oxide such as iron oxide, from 0.1 to 15 microns in diameter with an average diameter of about 0.7 micron but any hard material such as those hereinabove indicated may be used that may be produced in such small-sized particles. These particles in the second coat should be smaller in size than the particles of metal in the first primer coat although size is not so important as long as a material is used that is different from the metal in the first primer coat. As stated above, if the second primer coat contains the same metal as is in the first primer coat the metal of the second coat must be of smaller particle size than those of the first primer coat in order to secure best adhesion.

Before proceeding with a detailed description of some examples of the invention, it will be convenient to describe a typical cement that is used next the rubbery material as a "step-off" cement. The recipe for such a cement follows:

|  | A | B |
|---|---|---|
| A vulcanizable rubbery material | 100 | 100 |
| Channel black | 50 | 50 |
| Zinc oxide | 5 | 5 |
| Poly 2,2,4-trimethyl 1,2-dihydroquinoline | 5 | 5 |
| Crude lauric acid | 1.5 | 1.5 |
| Soft coal tar | 10 | 10 |
| Sulfur | 3 | 0 |
| "Butyl-8" (a dithiocarbamate type accelerator) | 0 | 8 |
|  | 174.5 | 179.5 |

All amounts given above are in parts by weight. 560 grams of A are dissolved in ethylene dichloride and 560 grams of B are dissolved in ethylene dichloride. Each is made up to 4.0 liters with more ethylene dichloride. The finished "step-off" cement is then made as needed by mixing equal volumes of A and of B together with 2 volumes of a vehicle such as a cement consisting of 20 parts by weight of chlorinated rubber (100–150 centipoise viscosity or containing approximately 65% chlorine), 200 parts of benzene and 2 parts of tetralin.

Due to the ingredients used in this particular cement it is vulcanized by allowing it to stand at ordinary room temperatures. Other cements may be used that are not air-curing by using other accelerators in place of the "Butyl-8." Similarly other compounding ingredients may be substituted for those specifically mentioned in the recipe given above. In general the "step-off" cement will contain the same rubbery material as is adhered to the base member and will contain the vehicle that is used in the primers. The recipe given is merely an example of a "step-off" cement and shows typical ingredients. Other age-resistors may be used for the poly 2,2,4-trimethyl 1,2-dihydro quinoline, other softeners may be used, and other accelerators may also be used instead of the "Butyl-8." By the proper choice of the accelerator and the amounts of sulfur used various desired rates of vulcanization may be obtained.

To further disclose the nature of the invention and the character of the materials used, three specific examples will be described with reference to the accompanying drawing of which the three figures illustrate in diagrammatic fashion the composite structures described respectively in the three specific examples. For clarity of illustration and ease of understanding, the thicknesses of the cement layers have been exaggerated and appropriate legends have been added to supplement the numerals in indicating the character of the various constituent layers.

*Example 1.*—A polished aluminum surface 10 is cleansed by wiping with pure acetone, washing, and then drying. This surface is then coated with a cement 11 made up by mixing 80 grams of chlorinated rubber, 8 grams of dibutyl phthalate, 700 cc. of chlorobenzene, and 450 grams of finely-divided zinc metal. This is allowed to dry and the dried coat is covered with a thin layer of a cement 12 made by mixing 210 grams of chlorinated rubber, 160 grams of red iron oxide, and 1,000 cc. of chlorotoluene, and this layer is also allowed to dry. To this coat is then applied a coating 13a of the "step-off" cement mixed as described above and containing for the rubbery material a synthetic elastic made by copolymerizing 55 parts butadiene and 45 parts of acrylonitrile. This same cement is applied as a coating 13b to one surface of a one-sixteenth inch thick slab 14 of a vulcanized copolymer of 55 parts of butadiene and 45 parts of acrylonitrile. The two freshly coated surfaces are allowed to dry from one to four minutes and then, when just dry, are pressed together in intimate contact, as by rolling with a roller, and allowed to set at room temperature. Upon complete curing which usually will require from 6 to 15 hours, the copolymer will be found to have become tenaciously adhered to the polished aluminum surface. The method of this example is particularly applicable for adhering anti-freeze feeding shoes to polished aluminum airplane propellers. Such shoes must be made of oil-resisting rubbery material and it has been difficult heretofore to obtain completely satisfactory adhesion between such shoes and the propeller body.

*Example 2.*—A piece of plate glass 15 is cleansed by washing it with a solution of trisodium phosphate, and washing with alcohol. The cleaned surface is coated with a cement 16 made by mixing 100 grams of rubber hydrochloride, 5 grams of dibenzyl ether, 800 cc. of chlorobenzene, and 500 grams of finely-divided iron metal. This is allowed to dry and the dried coat is covered with a layer of a cement 17 comprising 200 grams of rubber hydrochloride, 160 grams of finely ground lead oxide, and 1,000 cc. of chlorobenzene, and this layer is likewise allowed to dry. To this coat is then applied a coating 18a of a "step-off" cement similar to the one mixed as described above but with the rubbery material made by copolymerizing 70 parts butadiene and 30 parts methyl methacrylate and with rubber hydrochloride substituted for the chlorinated rubber. This same cement is also applied as a coating 18b to one surface of a sheet 19 of a vulcanized copolymer of 70 parts butadiene and 30 parts of methyl methacrylate. The two freshly coated surfaces are allowed to dry from one to four minutes and then, when just dry, are pressed together in intimate contact, as by rolling with a roller, and allowed to become thoroughly dry at room temperature. Upon complete curing, or after from 6 to 15 hours, the copolymer will be found to have become tenaciously adhered to the glass surface.

*Example 3.*—A smooth steel surface 20 is cleansed as by washing with pure benzene and then flooding it with water and drying. This surface is then coated wtih a cement 21 made up by mixing 200 grams of chlorinated rubber, 700 cc. of chlorobenzene, and 450 grams of finely-divided metallic copper. This coat is dried and then covered with a coat 22 made by mixing 210 grams of chlorinated rubber, 160 grams of finely-divided zinc carbonate powder, and 1,000 cc. of chlorotoluene. After this layer is dry it is given a coating 23a of the "step-off" cement mixed as described above but containing neoprene as the rubbery material, and with 4 parts of light magnesium oxide substituted for the sulfur and with 1 part by weight of mercapto benzo thiazole disulfide used instead of the butyl-8. This cement is also applied as a coating 23b to one surface of unvulcanized but vulcanizable neoprene 24. The assembly is put in a steam vulcanization press and vulcanized for 45 minutes at a temperature of 290° F.

By the method of this invention, rubbery material may be adhered to a wide variety of base members, especially those with smooth, polished surfaces of metal, glass and the like, to which adhesion has always been extremely difficult. In the two primer coats containing finely-divided metal and the finely-divided hard material vehicles such as chlorinated rubber, rubber isomers, cellulose ester, rubber hydrochloride, polyvinyl chloride, and the like may be used in cement form as binders for the metal and metallic oxide. Good adhesion may be obtained by using only the one primer coat containing powdered metal but for best adhesion it is recommended that both primer coats be used, the one next to the surface containing finely-divided metal and the secnod coat containing a hard material such as a finely-divided metallic oxide. In this invention any metal may be used that can be obtained in a fine size and likewise any hard material can be used that can also be obtained in a fine size.

In making up the cements used as primer coats any appropriate solvent may be used and the most convenient ones are those organic solvents that volatilize rapidly so as to cause no delay in drying the various coatings. Examples of such solvents are benzene, toluene, chlorobenzene, chlorotoluene, methyl ethyl ketone, acetone, butyl acetate, and ethyl acetate, or combinations of these or similar solvents.

The term "rubbery material" used throughout this application is intended to include all those natural rubbers, including caoutchouc, gutta percha, and balata, and synthetic elastic materials such as those made by copolymerizing butadiene with any of those materials that readily copolymerize with it. These include vinylidine chloride, styrene, isobutylene, acrylic and methacrylic esters, of which the most important is acrylic nitrile, as well as many others. Synthetics such as these are sold under the trade names of "Hycar," "Ameripol," "Buna S," "Perbunan," "Chemigum," and "Butyl." Other synthetic elastics such as organic polysulfides or "Thiokol," plasticized polyvinyl chloride or "Koroseal," resilient polyisobutylene or "Vistanex medium," copolymers of vinyl chloride and vinyl acetate or "Vinylite G," neoprene, and the like may be used in the invention. All these rubbery materials are thermoplastic and organic in nature and may be adhered to base members according to the method of the present invention. If the rubbery material is capable of being vulcanized it may be vulcanized to any desired degree in the finished product. Thus the invention is not concerned with any particular degree of vulcanization in the rubbery material but includes products in which this material is either unvulcanized or vulcanized to either the soft or the hard stage or to any intermediate stage.

Having described my invention in detail together with several specific binders, "step-off" cements, and rubbery materials in connection with various examples useful in practicing the method of this invention, it is my desire to protect the invention broadly within the spirit and scope of the appended claims.

I claim:

1. A composite structure comprising a base member, and a body of rubbery material secured to the base member by an intermediate bonding means, said bonding means including a first primer coat containing finely-divided metal of a particle size between 0.5 and 45 microns with an average particle size of from 2 to 10 microns adhered to the base member and a second primer coat containing a finely-divided hard material of a particle size between 0.1 and 15 microns adhered to the first primer coat.

2. A composite structure comprising a metal base member and a body of rubbery material secured to the metal base member by an intermediate bonding means, said bonding means including a first primer coat containing finely-divided metal of a particle size between 0.5 and 45 microns with an average particle size of from 2 to 10 microns adhered to the metal base member and a second primer coat containing a finely-divided hard material of a particle size between 0.1 and 15 microns adhered to the first primer coat.

3. A composite structure comprising a metal base member, and a body of rubbery material secured to the metal base member by an intermediate bonding means, said bonding means including a first primer coat containing finely-divided metal of a particle size between 0.5 and 45 microns with an average particle size of from 2 to 10 microns adhered to the metal base member and a second primer coat containing finely-divided metallic oxide of a particle size between 0.1 and 15 microns adhered to the first coat.

4. A composite structure comprising an aluminum base member, and a body of rubbery material secured to the aluminum base member by an intermediate bonding means, said bonding means including a first primer coat containing a finely-divided metal of a particle size between 0.5 and 45 microns with an average particle size of from 2 to 10 microns adhered to the aluminum base member and a second primer coat containing finely-divided metallic oxide of a particle size between 0.1 and 15 microns adhered to the first coat.

5. The method of making a composite structure which comprises securing a body of rubbery material to a base member by interposing between the base member and the rubbery material an intermediate bonding means, said bonding means including a first primer coat containing finely-divided metal of a particle size between 0.5 and 45 microns with an average particle size of from 2 to 10 microns adhered to the base member and a second primer coat containing a finely-divided hard material of a particle size between 0.1 and 15 microns adhered to the first primer coat.

6. The method of making a composite structure which comprises securing a body of rubbery material to a metal base member by interposing between the metal base member and the rubbery material an intermediate bonding means, said bonding means including a first primer coat containing finely-divided metal of a particle size between 0.5 and 45 microns with an average particle size of from 2 to 10 microns adhered to the metal base member and second primer coat containing finely-divided metallic oxide of a particle size between 0.1 and 15 microns adhered to the first coat.

7. The method of making a composite structure which comprises securing a body of rubbery material to an aluminum base member by interposing between the aluminum base member and the rubbery material an intermediate bonding means, said bonding means including a first primer coat containing finely-divided metal of a particle size between 0.5 and 45 microns with an average particle size of from 2 to 10 microns adhered to the aluminum base member and a second primer coat containing finely-divided metallic oxide of a particle size between 0.1 and 15 microns adhered to the first coat.

8. The method of making a composite structure which comprises securing a body of rubbery material to a base member by interposing between the base member and the rubbery material an intermediate bonding means, said bonding means including a primer coat adhered to the base member and comprising a binder and a finely-divided metal of a particle size between 0.5 and 45 microns with an average particle size of from 2 to 10 microns and at least one coat of a "step-off" cement adhered to the rubbery material.

9. The method of making a composite structure which comprises securing a body of rubbery material to a base member by interposing between the base member and the rubbery material an intermediate bonding means, said bonding means including a first primer coat adhered to the base member and comprising a binder containing finely-divided metal of a particle size between 0.5 and 45 microns with an average particle size of from 2 to 10 microns, a second primer coat adhered to the first primer coat and comprising the same binder containing a finely-divided hard material of a particle size between 0.1 and 15 microns, and a "step-off" cement adhered to the rubbery material.

DONALD V. SARBACH.

---

CERTIFICATE OF CORRECTION.

Patent No. 2,389,641.   November 27, 1945.

DONALD V. SARBACH.

It is hereby certified that error appears in the printed specification of the above numbered patent requiring correction as follows: Page 4, first column, line 19, beginning with the words "The method of making" strike out all to and including the syllable "terial" in line 7, same page, second column, comprising claim 8, and insert instead the following –

-- A composite structure comprising a base member and a body of rubbery material secured to the base member by an intermediate bonding means, said bonding means including a first primer coat adhered to the base member and comprising a binder containing finely-divided metal of a particle size between 0.5 and 45 microns with an average particle size of from 2 to 10 microns, a second primer coat adhered to the first primer coat and comprising the same binder containing a finely-divided hard material of a particle size between 0.1 and 15 microns, and a "step-off" cement adhered to the rubbery material --;

and that the said Letters Patent should be read with this correction therein that the same may conform to the record of the case in the Patent Office.

Signed and sealed this 19th day of March, A. D. 1946.

Leslie Frazer

First Assistant Commissioner of Patents.

(Seal)